US012729572B2

(12) United States Patent
Harris

(10) Patent No.: US 12,729,572 B2
(45) Date of Patent: Sep. 8, 2026

(54) DOOR HINGE

(71) Applicant: Eckel Industries of Canada Limited, Morrisburg (CA)

(72) Inventor: Brian G. Harris, Morrisburg (CA)

(73) Assignee: Eckel Industries of Canada Limited (CA)

( * ) Notice: Subject to any disclaimer, the term of this patent is extended or adjusted under 35 U.S.C. 154(b) by 0 days.

(21) Appl. No.: 18/121,133

(22) Filed: Mar. 14, 2023

(65) Prior Publication Data

US 2024/0044191 A1 Feb. 8, 2024

Related U.S. Application Data

(63) Continuation of application No. 17/197,222, filed on Mar. 10, 2021, now Pat. No. 11,603,686.

(60) Provisional application No. 62/987,622, filed on Mar. 10, 2020.

(51) Int. Cl.
*E05D 3/02* (2006.01)

(52) U.S. Cl.
CPC .......... *E05D 3/02* (2013.01); *E05D 2003/027* (2013.01)

(58) Field of Classification Search
CPC ....... E05D 3/02; E05D 2003/027; E05D 5/06; E05Y 2800/26
See application file for complete search history.

(56) References Cited

U.S. PATENT DOCUMENTS 214,214 A * 4/1879 Washburn ................. E05D 5/06 16/385
385,156 A * 6/1888 Wien ...................... E05F 1/063 16/318
454,343 A * 6/1891 Gibson ................... E05F 1/063 16/318
480,238 A * 8/1892 Ranker ..................... E05D 3/02 16/389
686,025 A * 11/1901 Cannon ................. E05D 7/0027 16/248
749,379 A * 1/1904 Hartman ................. E05F 1/063 16/318
792,866 A * 6/1905 Warner ..................... E05D 3/02 16/265
794,454 A * 7/1905 Davis et al. .......... E05D 7/0407 16/240

(Continued)

FOREIGN PATENT DOCUMENTS

JP 2012097523 A * 5/2012
JP 2017133341 A * 8/2017

(Continued)

*Primary Examiner* — Jason W San
*Assistant Examiner* — Matthew J Sullivan
(74) *Attorney, Agent, or Firm* — Pandiscio & Pandiscio

(57) ABSTRACT

A door hinge comprising: a frame mount configured to be mounted to a door frame which is disposed about a doorway; and a door mount configured to be mounted to a door which is to selectively close off the doorway; wherein the door mount is pivotally connected to the frame mount about an axis of rotation, and further wherein the door hinge is configured such that when the frame mount is mounted to a door frame, and when the door mount is mounted to a door, the axis of rotation of the door hinge is disposed outwards of the point of attachment of the door hinge to the door frame, and laterally outboard of the doorway.

12 Claims, 4 Drawing Sheets

(56) References Cited

U.S. PATENT DOCUMENTS 925,910 A * 6/1909 Hoke ........................ E05D 3/02 16/265
1,028,874 A * 6/1912 Gronek ................... E05F 1/063 16/312
1,249,815 A * 12/1917 Otte ....................... D05B 81/00 16/282
1,446,722 A * 2/1923 Peltier ....................... E05D 3/02 16/270
1,509,613 A * 9/1924 Russakov ................. E05D 3/02 16/390
1,727,319 A * 9/1929 Wasmuth .................. E05D 3/02 16/389
1,812,908 A * 7/1931 Toncray .................... E05D 3/02 16/251
2,137,529 A * 11/1938 Ferris ........................ E05D 3/02 16/386
2,166,815 A * 7/1939 Jones ........................ E05D 3/02 16/223
2,315,488 A * 4/1943 Aldeen ..................... E05D 3/02 29/11
2,624,067 A * 1/1953 Tassell .................... E05D 5/065 16/389
2,648,870 A * 8/1953 Wilhelmi ................ E05D 5/065 16/390
3,021,554 A * 2/1962 Anderson ................. E05D 5/06 16/389
3,102,307 A * 9/1963 Johnson ................ E05C 19/024 16/389
3,439,377 A * 4/1969 Bucholz .................. E05D 5/065 16/389
3,710,416 A * 1/1973 Phelps .................... E05D 5/065 16/390
3,881,220 A * 5/1975 Kiraly ..................... E05D 5/065 16/391
3,969,846 A * 7/1976 Scott ......................... E06B 1/00 49/504
D272,597 S * 2/1984 Cascone ......................... 16/390
4,439,888 A * 4/1984 Merillat .............. E05D 11/1014 16/72
4,570,384 A 2/1986 Eckel
4,864,688 A * 9/1989 Gerber ...................... E05D 3/02 16/382
4,945,606 A 8/1990 Eckel
4,951,351 A 8/1990 Eckel
5,216,839 A * 6/1993 Woodruff ................ E06B 5/003 49/495.1
5,282,293 A * 2/1994 Pedoeem .................. E05D 3/12 16/371
5,459,972 A 10/1995 Eckel
6,449,802 B2 * 9/2002 Maeda .................... E05D 11/00 16/389
6,725,968 B2 * 4/2004 Quam ....................... E06B 5/20 181/287
D493,351 S * 7/2004 Wegman ......................... D8/323
D497,534 S * 10/2004 Wegman ......................... D8/323
6,990,772 B2 1/2006 Eckel et al.
9,816,303 B2 * 11/2017 Lee ....................... E05D 5/0276
9,879,456 B1 * 1/2018 Chen ....................... E05D 11/10
10,544,611 B2 * 1/2020 Nicholas, III ........ E05D 7/1005
10,603,598 B2 * 3/2020 Kwan .................. A63H 17/262
11,072,953 B2 * 7/2021 Georg ....................... E05D 3/02
11,111,709 B1 * 9/2021 Santa .................... E05D 7/0009
11,542,736 B2 * 1/2023 Adcock ..................... E05D 9/00
11,603,686 B2 * 3/2023 Harris ....................... E05D 5/06
11,619,085 B1 * 4/2023 Anderson, Jr. ......... E05D 5/062 414/800
12,037,826 B2 * 7/2024 Lin ......................... E05D 11/08
12,173,955 B2 * 12/2024 Li ........................... E05F 1/063
2004/0034969 A1 * 2/2004 Wegman ................... E05D 5/06 16/389
2004/0231106 A1 * 11/2004 Shire ......................... E05D 5/06 16/390
2008/0127565 A1 * 6/2008 Taylor ....................... E05D 7/04 49/394
2011/0232033 A1 * 9/2011 Bartels .................. E05D 7/0423 16/242
2014/0096450 A1 * 4/2014 Thompson ................ E05D 5/06 29/434
2016/0237729 A1 * 8/2016 Kohlweiss ................ E05D 3/02
2020/0032564 A1 * 1/2020 Escure ...................... E05D 5/08
2020/0181964 A1 * 6/2020 Wu ....................... E05F 1/1215
2020/0270921 A1 * 8/2020 Fink ...................... E05D 7/1061
2020/0362504 A1 * 11/2020 Li ............................. E05D 5/04
2021/0115716 A1 * 4/2021 Watanabe ............... E05D 7/009
2021/0285270 A1 * 9/2021 Harris ....................... E05D 5/04
2021/0387714 A1 * 12/2021 Nakao .................... B64D 11/02
2022/0056742 A1 * 2/2022 Kim ........................ E05D 11/10
2022/0106819 A1 * 4/2022 Zeitler ...................... E05D 3/02
2022/0106824 A1 * 4/2022 Iijima ..................... E05F 1/061
2024/0044191 A1 * 2/2024 Harris ....................... E05D 5/04
2024/0317162 A1 * 9/2024 Sugawara ............... B60R 16/03

FOREIGN PATENT DOCUMENTS

JP 2019189203 A * 10/2019 .......... B64C 1/1461
JP 6630192 B2 * 1/2020
KR 20070012897 A * 1/2007 ............... E05D 5/02

* cited by examiner

DOOR HINGE

REFERENCE TO PENDING PRIOR PATENT APPLICATIONS

This patent application is a continuation of pending prior U.S. patent application Ser. No. 17/197,222, filed Mar. 10, 2021 by Eckel Industries of Canada Limited and Brian G. Harris for DOOR HINGE, which patent application in turn claims benefit of prior U.S. Provisional Patent Application Ser. No. 62/987,622, filed Mar. 10, 2020 by Eckel Industries of Canada Limited and Brian G. Harris for DOOR HINGE.

The two (2) above-identified patent applications are hereby incorporated herein by reference.

FIELD OF THE INVENTION

This invention relates to hinges in general, and more particularly to door hinges.

BACKGROUND OF THE INVENTION

A conventional door hinge typically comprises two flat plates pivotally connected by a pin. More particularly, and looking first at FIGS. 1 and 2, a conventional door hinge A generally comprises two flat plates B each having a series of cylindrical loops C formed along one of their edges. The cylindrical loops C of the two flat plates B are aligned in an alternating fashion, and a pin D, inserted through the aligned cylindrical loops C, pivotally connects the two flat plates B to one another. Together, these elements function as a joint, with the two flat plates B rotating about the longitudinal axis of the pin D.

The conventional door hinge A is typically attached to a door and a door frame via screws driven through a plurality of fastening holes E provided in each of the two flat plates B. By way of example, and looking now at FIGS. 3A-3C, one of the flat plates B is attached to an inner face F of a door frame G while the other flat plate B is attached to a side face H of a corresponding door I. FIG. 3A shows the door I in a "fully-open" position, FIG. 3B shows the door I in a "half-open" position wherein the plane J of the door I is perpendicular to the plane K of the door frame G, and FIG. 3C shows the door in a "fully-closed" position.

Note that with the conventional door hinge A, pin D is disposed adjacent to, and aligned with, the junction of door I and the door frame G (i.e., in the context of FIG. 3C, pin D is located adjacent to the aligned front faces L and M of the door I and door frame G, respectively, and pin D is aligned with the two parallel flat plates B and with the inner face F of door frame G and the side face H of door I).

When the door is in the "fully-open" position (FIG. 3A), the doorway width N of the doorway P is substantially clear. When the door is in the "fully-closed" position (FIG. 3C), the doorway width N of the doorway P is completely blocked by the door I. Significantly, when the door I is in the "half-open" position (FIG. 3B), the doorway width N is partially blocked by the door I. More particularly, and as can be seen in FIG. 3B, when the door I is in the "half-open" position, the doorway width N is reduced to a smaller effective doorway width N', with the effective doorway width N' being smaller than the doorway width N by an amount which is equal to the thickness of the door I. This is due to the configuration of the conventional door hinge A and the disposition of the "half-open" door I relative to the door frame G. This can be a problem in cases where large objects must be moved through the doorway and the door cannot be opened to the "fully-open" position. For instance, a door may only be able to open to the "half-open" position when the door frame is adjacent to a wall, and in this case, the width of objects that can be passed through the door frame is limited to the smaller dimension of the effective doorway width N'. It will be appreciated that this problem increases as the thickness of the door increases, e.g., such as in the case of refrigerated rooms where the door must be relatively thick for insulation purposes.

Thus, there is a need for a new door hinge which allows a doorway to be completely clear when the corresponding door is in the "half-open" position.

SUMMARY OF THE INVENTION

This and other objects of the present invention are addressed by the provision and use of a novel door hinge wherein the novel door hinge has a configuration such that the axis of rotation of the door hinge is disposed outwards of the point of attachment of the door hinge to the door frame, and laterally outboard of the doorway.

More particularly, in accordance with the present invention, there is provided a new and improved door hinge which generally comprises a frame mount and a door mount. Both the frame mount and the door mount comprise angled plates and are configured to be attached to a door frame and a door, respectively. The frame mount and the door mount are pivotally connected together so as to form a joint wherein the axis of rotation of the joint is disposed outwards of the point of attachment of the door hinge to the door frame, and laterally outboard of the doorway due to the shapes of the angled plates. In use, when the door is rotated about the axis of rotation to the "half-open" position, the door is disposed far enough to the side of the doorway such that the door does not block the doorway (in other words, the doorway width N is not reduced to a smaller effective doorway width N').

In one form of the present invention, there is provided a door hinge comprising:

- a frame mount configured to be mounted to a door frame which is disposed about a doorway; and
- a door mount configured to be mounted to a door which is to selectively close off the doorway;
- wherein the door mount is pivotally connected to the frame mount about an axis of rotation, and further wherein the door hinge is configured such that when the frame mount is mounted to a door frame, and when the door mount is mounted to a door, the axis of rotation of the door hinge is disposed outwards of the point of attachment of the door hinge to the door frame, and laterally outboard of the doorway.

In another form of the present invention, there is provided a door system comprising:

- a door frame defining a doorway;
- a door for selectively closing off the doorway; and
- a door hinge for pivotally mounting the door to the door frame, wherein the door hinge comprises:
  - a frame mount mounted to the door frame; and
  - a door mount mounted to the door;
  - wherein the door mount is pivotally connected to the frame mount about an axis of rotation, and wherein the axis of rotation is disposed outwards of the point of attachment of the door hinge to the door frame, and laterally outboard of the doorway, such that when the door is rotated about the axis of rotation to the half-open position, the door is disposed far enough to the side of the doorway such that the door does not block the doorway.

In another form of the present invention, there is provided a method for selectively closing off a doorway, the method comprising:

providing a door system comprising:

a door frame defining a doorway;

a door for selectively closing off the doorway; and a door hinge for pivotally mounting the door to the door frame, wherein the door hinge comprises:

a frame mount mounted to the door frame; and a door mount mounted to the door;

wherein the door mount is pivotally connected to the frame mount about an axis of rotation, and wherein the axis of rotation is disposed outwards of the point of attachment of the door hinge to the door frame, and laterally outboard of the doorway, such that when the door is rotated about the axis of rotation to the half-open position, the door is disposed far enough to the side of the doorway such that the door does not block the doorway; and moving the door relative to the door frame.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein.

DETAILED DESCRIPTION OF THE PREFERRED EMBODIMENTS

The present invention comprises the provision and use of a novel door hinge which allows a doorway to be completely clear when the corresponding door is in the "half-open" position.

Figure 4:
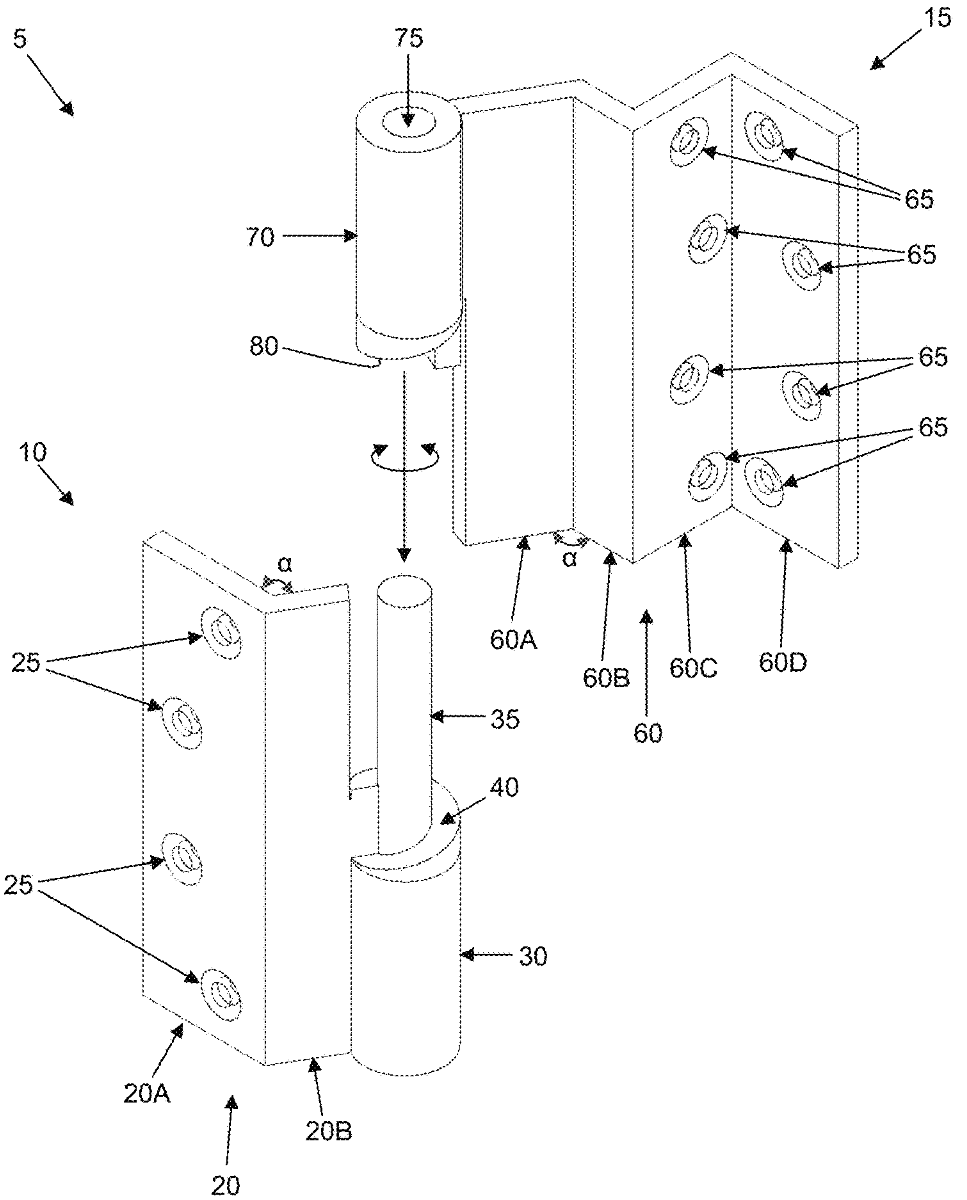
FIG. 4 is an exploded perspective view of a novel door hinge formed in accordance with the present invention.
Figure 5:
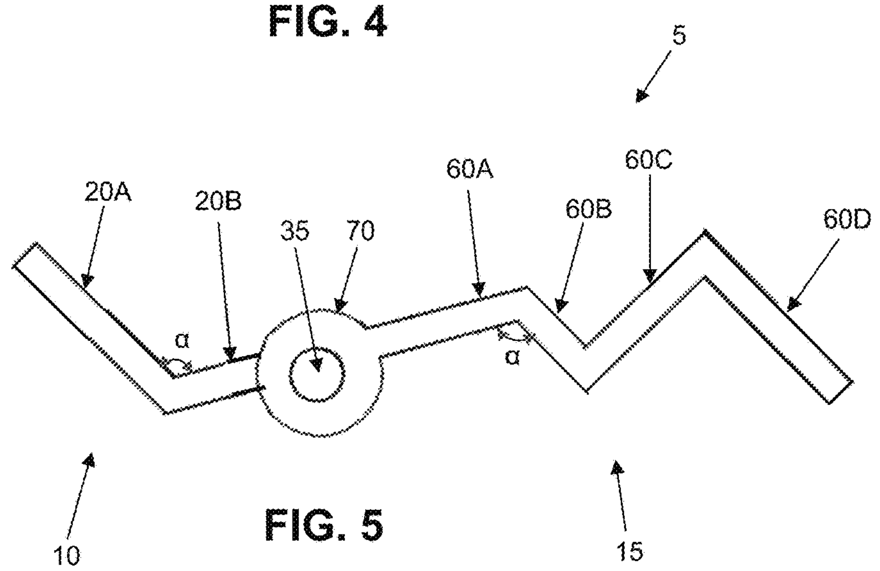
FIG. 5 is a top view of the novel door hinge of FIG. 4.

Looking first at FIGS. 4 and 5, the novel door hinge 5 generally comprises a frame mount 10 and a door mount 15.

Frame mount 10 comprises an angled plate 20 having a first flat section 20A and a second flat section 20B, wherein the two flat sections 20A and 20B are joined to one another, and further wherein an obtuse angle α is formed between the two flat sections 20B. Angled plate 20 also has a plurality of fastening holes 25 formed in first section 20A.

Frame mount 10 further comprises a cylinder 30 and a cylindrical pin 35. Cylinder 30 is attached to the side edge of second flat section 20B and pin 35 extends upward from the top of cylinder 30. Pin 35 has a smaller diameter than cylinder 30. Cylinder 30 comprises a top surface 40. In one preferred form of the invention, top surface 40 has a helical configuration.

Door mount 15 comprises an angled plate 60 having a first flat section 60A, a second flat section a third flat section 60C and a fourth flat section 60D, wherein the four flat sections 60A-60D are joined to one another, and further wherein an obtuse angle α is formed between first flat section and second flat section 60B (i.e., the same obtuse angle α that is formed between first flat section 20A and second flat section 20B of angled plate 20 of frame mount 10). Angled plate 60 also comprises fastening holes 65 formed in third flat section 60C and fourth flat section 60D.

Door mount 15 further comprises a cylindrical tube 70 having a lumen 75, wherein cylindrical tube 70 is attached to angled plate 60 along the side edge of first flat section 60A and lumen 75 is sized to slidingly receive cylindrical pin 35 of frame mount 10. Cylindrical tube 70 comprises a bottom surface 80. In one preferred form of the invention, bottom surface 80 has a helical configuration which is the complement of the helical surface formed on top surface 40 of cylinder 30 of frame mount 10.

Figure 6A:
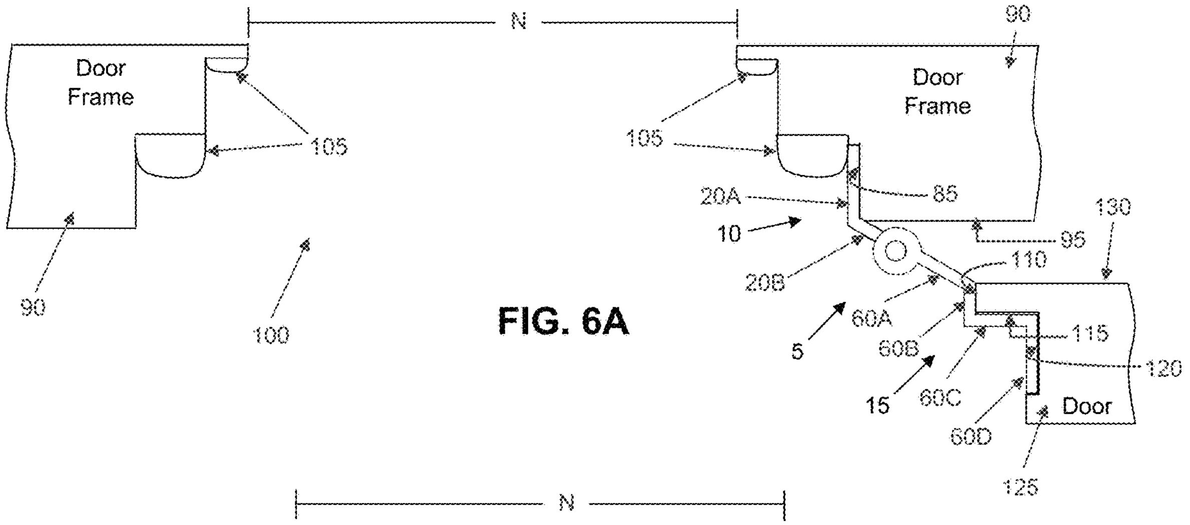
FIGS. 6A-6C are schematic views showing the novel door hinge of FIGS. 4 and 5 in use.
Figure 6B:
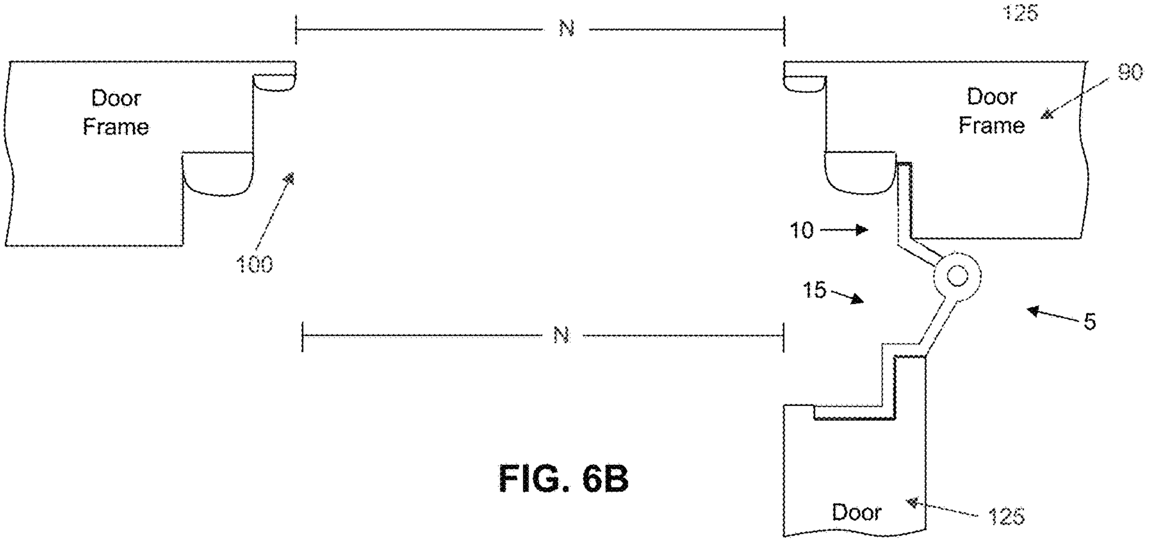
Figure 6C:
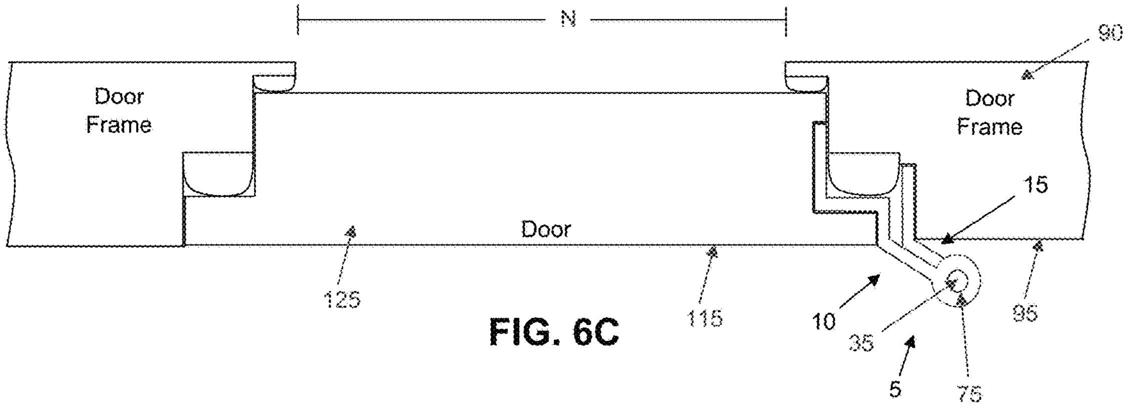

Looking next at FIGS. 6A-6C, when frame mount 10 is fastened onto an inner face 85 of a door frame 90 via screws (not shown) driven through fastening holes in first flat section 20A, first flat section 20A lies flat against the inner face 85 of the door frame and second flat section 20B of frame mount 10 juts outward of, and to the side of, the point of attachment to the door frame 90 (i.e., outwards from the front face 95 of the door frame 90 and angled away from the doorway 100) due to the angle α in angled plate 20. Significantly, because cylinder 30 is attached to second flat section 20B, cylinder 30 and cylindrical pin 35 are also disposed outwards of, and to the side of, doorway 100. Note that bumpers or seals 105 may be disposed on various faces of door frame 90.

Similarly, and still looking now at FIGS. 6A-6C, when door mount 15 is fastened onto the side faces 110, 115 and 120 of a door 125 via screws (not shown) driven through fastening holes 65 in third flat section 60C and fourth flat section 60D, second flat section 60B, third flat section 60C and fourth flat section 60D lie flush against the side faces 110, 115 and 120, respectively, of the door 125, and first flat section 60A juts outwards of, and to the side of, the point of attachment to the door 125 (i.e., outwards from the front face 115 of the door 125 and away from the front face 115 of the door 125) due to the angle α in angled plate 60. Significantly, because cylindrical tube 70 is attached to first flat section cylindrical tube 70 is also disposed away from the front face 115 of the door 125 and away from the front face 115 of the door 125.

With frame mount 10 fastened onto inner face 85 of the door frame 90 and door mount 15 fastened onto the side faces 110, 115 and 120 of the door 125, the two mounts 10, 15 can be brought together so as to mount the door 125 to the door frame 90. More particularly, to mate door mount 15 with frame mount 10, cylindrical tube 70 of door mount 15 is slid over pin 35 of frame mount 10, with lumen 75 of cylindrical tube 70 slidably receiving pin 35. Cylindrical tube is not fixed to cylinder 30 or pin 35, thus allowing cylindrical tube 70 (and, therefore, door mount 15 and the door 125 attached to door mount 15) to rotate about the axis of pin 35 and to be removed/lifted off of pin 35. This freedom eases the installation and maintenance of a door using novel door hinge 5.

It will be appreciated that when frame mount 10 is fastened onto door frame 90, and when door mount 15 is fastened onto door 125, and when cylindrical tube 70 is mounted onto pin 35, the axis of rotation of door 125 relative to door frame 90 (i.e., the longitudinal axis of pin 35 and lumen 75) is disposed outwards of the point of attachment of the door hinge to the door frame, and laterally outboard of the doorway, i.e., in the context of FIG. 6C, pin 35 and lumen 75 are disposed outwards of the aligned front faces 115 and 95 of door 125 and door frame 90, respectively, and pin 35 and lumen 75 are disposed laterally outboard of the doorway 100.

It will be appreciated that door mount 15 and frame mount 10 do not need to be fastened onto the door 125 and the door frame 90, respectively, before door mount 15 and frame mount 10 are mated to one another. If desired, door mount 15 and frame mount 10 can be mated to one another before door mount 15 and frame mount 10 are fastened onto the door 125 and the door frame 90, respectively.

Where bottom surface 80 of door mount 15 and top surface 40 of frame mount 10 have a helical configuration, helical bottom surface 80 of door mount will engage helical top surface 40 of frame mount when door mount 15 is pivotally mounted onto frame mount 10, whereby to provide a "self-closing" feature to door hinge 5. More particularly, when door mount is mated to frame mount 10, helical bottom surface on the bottom of cylindrical tube 70 sits upon helical top surface 40 on the top of cylinder 30. Both helical top surface 40 and helical bottom surface 80 are canted and designed such that door hinge 5 is biased, via gravity, towards the "fully-closed" position. When the door is opened, door mount 15 rotates about the axis of pin 35 and rises slightly along pin 35 due to canted helical bottom surface 80 rotating in the inclining direction of canted helical top surface 40. When the user releases the door, gravity rotates door mount 15 in the opposite direction (i.e., in the declining direction of canted helical top surface 40), thereby returning the door to the "fully-closed" position.

FIGS. 6A-6C show novel door hinge 5 in use. FIG. 6A shows the door in a "fully-open" position, FIG. 6B shows the door in a "half-open", and FIG. 6C shows the door in a "fully-closed" positon.

Figure 3A:
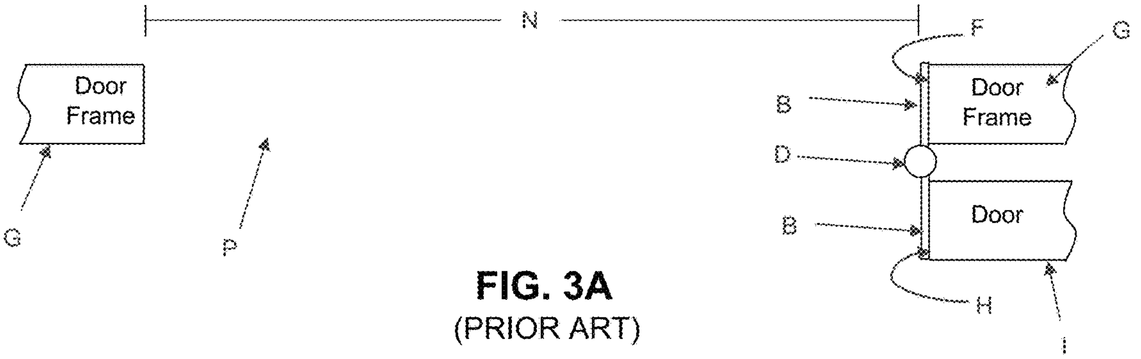
FIG. 3A (PRIOR ART)
FIGS. 3A-3C are schematic views showing a conventional door hinge in use.
Figure 3B:
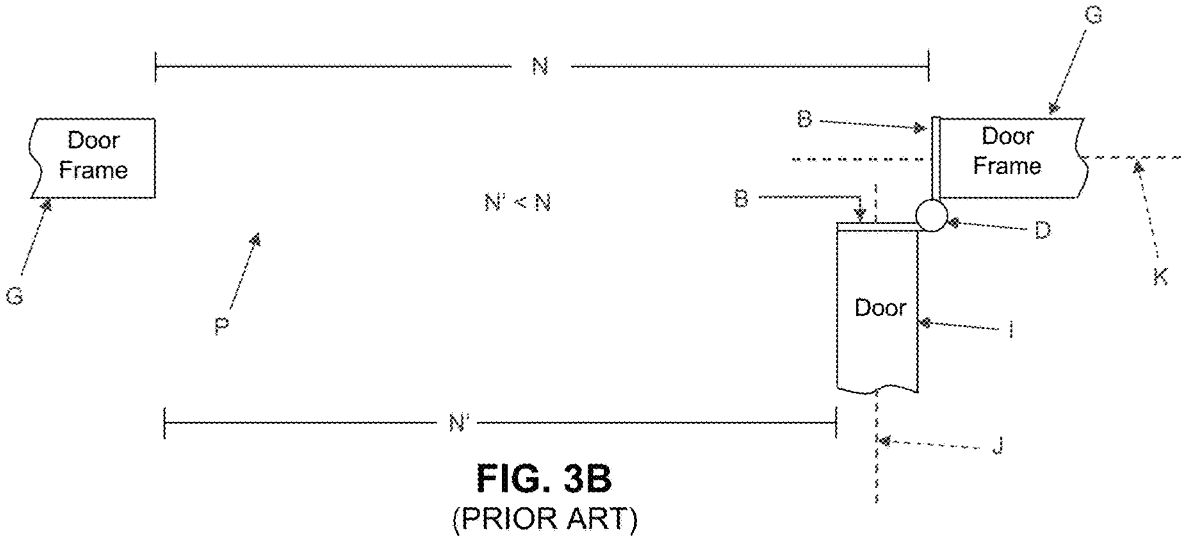
FIG. 3B (PRIOR ART)
Figure 3C:
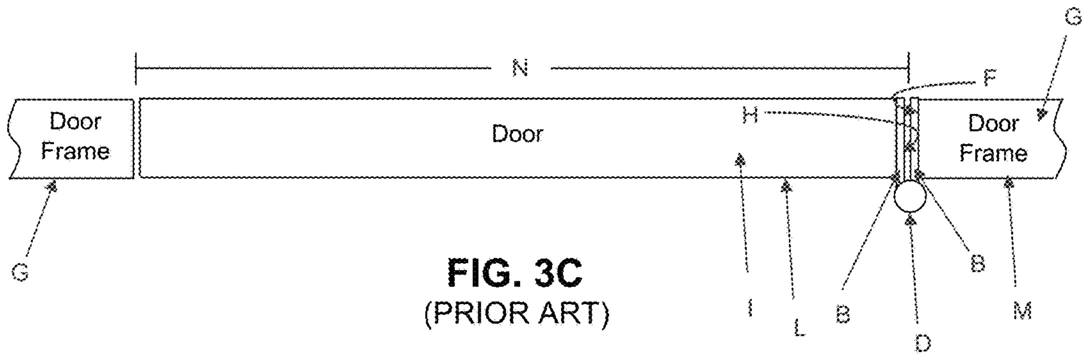
FIG. 3C (PRIOR ART)

With the door in the "fully-open" position (FIG. 6A), the doorway 100 is completely clear. With the door in the "fully-closed" position (FIG. 6C), the doorway 100 is completely blocked by the door. Significantly, when the door is in the "half-open" position (FIG. 6B), the doorway 100 is completely clear. In other words, the doorway width N is not reduced to a smaller effective doorway width N' when the door is in the "half-open" position, as is the case with a conventional door hinge (compare FIG. 6B with FIG. 3B). Novel door hinge 5 accomplishes this by placing the axis of rotation of the door hinge (i.e., pin 35 of frame mount 10 and lumen 75 of door mount 15) outwards of the point of attachment of the door hinge to the door frame, and laterally outboard of the doorway.

It will be appreciated that while FIGS. 4, 5 and 6A-6C show novel door hinge 5 in a "right-handed" configuration for use with a door that swings outwards to the right (from the frame of reference of FIGS. 6A-6C), the configuration of novel door hinge 5 can be mirrored such that it is in a "left-handed" configuration that can be used with a door that swings outwards to the left (from the frame of reference of FIGS. 6A-6C).

In another form of the invention, helical bottom surface 80 on the bottom of cylindrical tube 70 and helical top surface 40 on the top of cylinder 30 are replaced by flat (i.e., non-canted) surfaces. With such flat surfaces, door hinge 5 is unbiased and does not possess a "self-closing" feature. In use, when the door is opened, door mount 15 rotates about the axis of pin 35, but door mount 15 does not rise. When the door is released, door mount 15 (and therefore the door) remains in its current position until it is manually closed.

Figure 1:
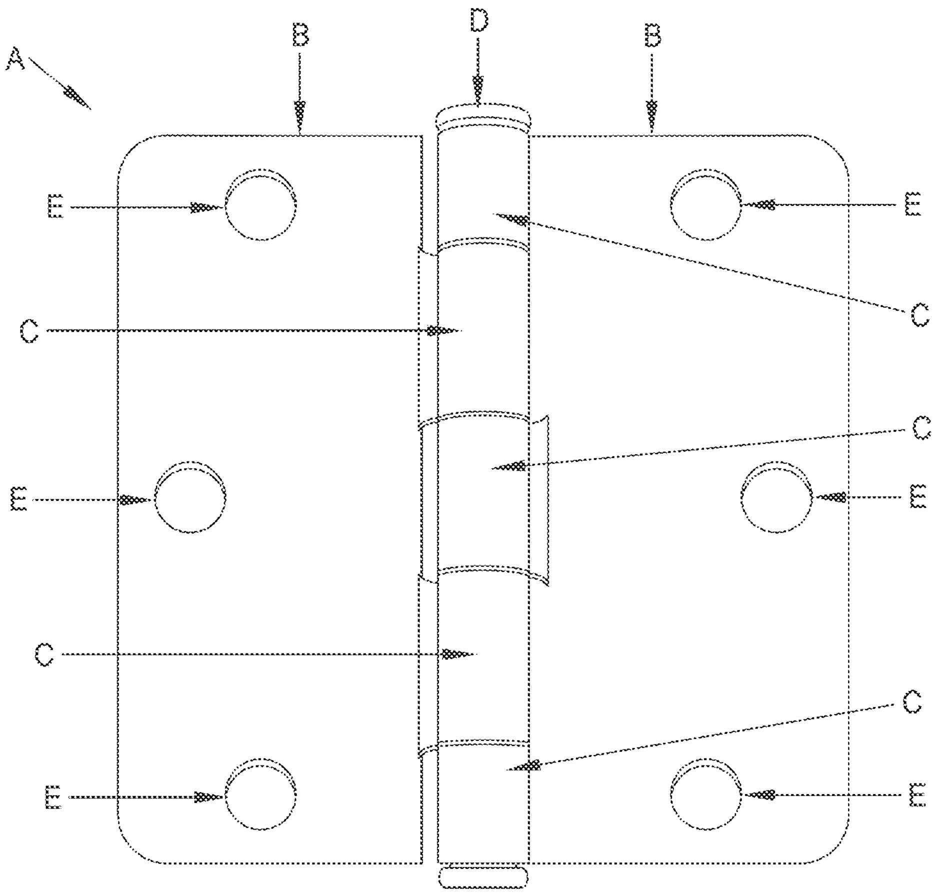
FIG. 1 (PRIOR ART)
FIG. 1 is a side view of a conventional door hinge.
Figure 2:
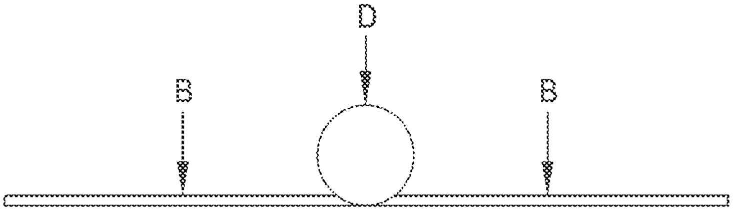
FIG. 2 (PRIOR ART)
FIG. 2 is a top view of a conventional door hinge.

In the foregoing disclosure, frame mount 10 and door mount 15 are pivotally connected to one another via the slidable mounting of cylindrical tube 70 on pin 35. However, other means which will be familiar to those skilled in the art can be used to pivotally connect frame mount 10 and door mount 15. By way of example but not limitation, second flat section 20B and first flat section 60A can be provided with cylindrical loops (e.g., similar to the cylindrical loops C shown in FIG. 1), the cylindrical loops can be aligned with one another, and then a pin (e.g., similar to the pin D show in FIG. 1) can be passed through the aligned cylindrical loops so to pivotally connect door mount 15 and frame mount 10.

Modifications

It will be understood that many additional changes in the details, materials, steps and arrangements of parts, which have been herein described and illustrated in order to explain the nature of the invention, may be made by those skilled in the art within the principles and scope of the invention as expressed in the appended claims.

What is claimed is:

1. A door hinge comprising:

a frame mount comprising a first section configured to be mounted to an inner face of a door frame which is disposed about a doorway, and a second section extending at an obtuse angle relative to the first section, wherein the second section of the frame mount comprises a first portion of a pivot mount; and a door mount comprising a first section configured to be mounted to a door which is to selectively close off the doorway and a second section extending at an obtuse angle to the first section of the door mount, wherein the second section of the door mount comprises a second portion of the pivot mount;

wherein the first section of the door mount comprises:

a first flat section configured to be mounted to a side face of a door; and a second flat section extending at an angle to the first flat section of the door mount;

wherein the second section of the door mount comprises:

a third flat section extending at an angle to the second flat section of the door mount; and a fourth flat section extending at an angle to the third flat section of the door mount;

wherein the pivot mount pivotally connects the frame mount to the door mount about an axis of rotation, wherein the first portion of the pivot mount and the second portion of the pivot mount each comprise a top surface and a bottom surface, wherein the top surface of the first portion of the pivot mount comprises a canted face and the bottom surface of the second portion of the pivot mount comprises a canted face, wherein the door hinge is configured such that when the frame mount is mounted to a door frame, and when the door mount is mounted to a door, the axis of rotation of the door hinge is disposed at an angle laterally outboard of the door frame and the canted faces of the pivot mount bias the door towards a closed position;

and further wherein an inner face of the first flat section of the door mount and an inner face of the second flat section of the door mount are configured to be disposed on a seal of the door when the door is closed.

2. A door hinge according to claim 1 wherein the first portion of the pivot mount comprises a body having a pin extending therefrom, wherein the second portion of the pivot mount comprises a body having a lumen formed therein, and further wherein the lumen is sized to slidingly receive the pin therein.

3. A door hinge according to claim 1 wherein the bottom surface of the first portion of the pivot mount comprises a planar configuration, and further wherein the top surface of the second portion of the pivot mount comprises a planar configuration.

4. A door hinge according to claim 1 wherein the first section of the frame mount comprises a plurality of fastening holes, and further wherein the first section of the door mount comprise a plurality of fastening holes.

5. A door system comprising:
- a door frame defining a doorway;
- a door for selectively closing off the doorway; and
- a door hinge for pivotally mounting the door to the door frame, wherein the door hinge comprises:
  - a frame mount comprising a first section mounted to an inner face of the door frame, and a second section extending at an obtuse angle relative to the first section, wherein the second section of the frame mount comprises a first portion of a pivot mount; and
  - a door mount comprising a first section mounted to the door and a second section extending at an obtuse angle to the first section of the door mount, wherein the second section of the door mount comprises a second portion of the pivot mount;
  - wherein the first section of the door mount comprises:
    - a first flat section configured to be mounted to a side face of the door; and
    - a second flat section extending at an angle to the first flat section of the door mount;
  - wherein the second section of the door mount comprises:
    - a third flat section extending at an angle to the second flat section of the door mount; and
    - a fourth flat section extending at an angle to the third flat section of the door mount;
  - wherein the pivot mount pivotally connects the frame mount to the door mount about an axis of rotation, wherein the first portion of the pivot mount and the second portion of the pivot mount each comprise a top surface and a bottom surface, wherein the top surface of the first portion of the pivot mount comprises a canted face and the bottom surface of the second portion of the pivot mount comprises a canted face, and wherein the axis of rotation is disposed laterally outboard of the doorway, such that when the door is rotated about the axis of rotation to the half-open position, the door does not block the doorway, and further wherein the canted faces of the pivot mount bias the door towards a closed position;
- wherein the door frame comprises at least one seal; and
- wherein an inner face of the first flat section of the door mount and an inner face of the second flat section of the door mount are configured to be disposed on the at least one seal when the door is closed.

6. A door system according to claim 5 wherein the first portion of the pivot mount comprises a body having a pin extending therefrom, wherein the second portion of the pivot mount comprises a body having a lumen formed therein, and further wherein the lumen is sized to slidingly receive the pin therein.

7. A door system according to claim 5 wherein the bottom surface of the first portion of the pivot mount comprises a planar configuration, and further wherein the top surface of the second portion of the pivot mount comprises a planar configuration.

8. A door system according to claim 5 wherein the first section of the frame mount comprises a plurality of fastening holes, and further wherein the first section of the door mount comprise a plurality of fastening holes.

9. A method for selectively closing off a doorway, the method comprising:
- providing a door system comprising:
  - a door frame defining a doorway;
  - a door for selectively closing off the doorway; and
  - a door hinge for pivotally mounting the door to the door frame, wherein the door hinge comprises:
    - a frame mount comprising a first section mounted to an inner face of the door frame, and a second section extending at an obtuse angle relative to the first section, wherein the second section of the frame mount comprises a first portion of a pivot mount; and
    - a door mount comprising a first section mounted to the door and a second section extending at an obtuse angle to the first section of the door mount, wherein the second section of the door mount comprises a second portion of the pivot mount;
    - wherein the first section of the door mount comprises:
      - a first flat section configured to be mounted to a side face of the door; and
      - a second flat section extending at an angle to the first flat section of the door mount;
    - wherein the second section of the door mount comprises:
      - a third flat section extending at an angle to the second flat section of the door mount; and
      - a fourth flat section extending at an angle to the third flat section of the door mount; and
    - wherein the pivot mount pivotally connects the frame mount to the door mount about an axis of rotation, wherein the first portion of the pivot mount and the second portion of the pivot mount each comprise a top surface and a bottom surface, wherein the top surface of the first portion of the pivot mount comprises a canted face and the bottom surface of the second portion of the pivot mount comprises a canted face, and wherein the axis of rotation is disposed laterally outboard of the doorway, such that when the door is rotated about the axis of rotation to the half-open position, the door does not block the doorway, and further wherein the canted faces of the pivot mount bias the door towards a closed position;
  - wherein the door frame comprises at least one seal;
  - wherein an inner face of the first flat section of the door mount and an inner face of the second flat section of the door mount are configured to be disposed on the at least one seal when the door is closed; and
- moving the door relative to the door frame.

10. A method according to claim 9 wherein the first portion of the pivot mount comprises a body having a pin extending therefrom, wherein the second portion of the pivot mount comprises a body having a lumen formed therein, and further wherein the lumen is sized to slidingly receive the pin therein.

11. A method according to claim 10 wherein the bottom surface of the first portion of the pivot mount comprises a planar configuration, and further wherein the top surface of the second portion of the pivot mount comprises a planar configuration.

12. A method according to claim 9 wherein the first section of the frame mount comprises a plurality of fastening holes, and further wherein the first section of the door mount comprise a plurality of fastening holes.

* * * * *